G. W. Wait,
Wood Auger.

No. 54,825. Patented May 15, 1866.

Witnesses:

Inventor:
G. W. Wait.

UNITED STATES PATENT OFFICE.

G. W. WAIT, OF WAYLAND, MICHIGAN, ASSIGNOR TO HIMSELF AND A. J. SMITH, OF SAME PLACE.

IMPROVEMENT IN TOOLS FOR MAKING SPILES.

Specification forming part of Letters Patent No. 54,825, dated May 15, 1866.

*To all whom it may concern:*

Be it known that I, G. W. WAIT, of Wayland, in the county of Allegan and State of Michigan, have invented a new and Improved Tool for Boring and Shaping Spiles; and I do hereby declare that the following is a full, clear, and exact description thereof, which will enable others skilled in the art to make and use the same, reference being had to the accompanying drawings, forming a part of this specification, in which—

Figure 1:
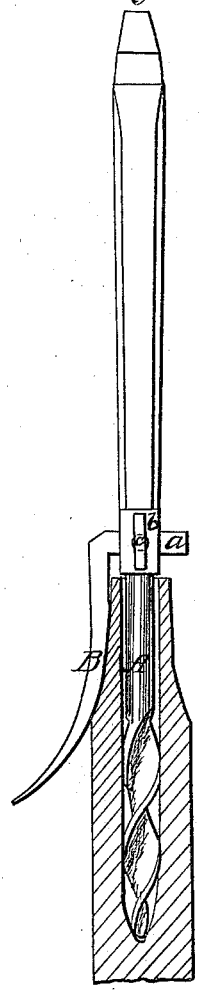
Figure 2:
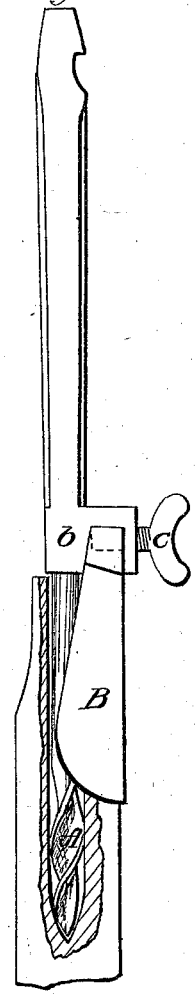

Figure 1 is a side elevation of my invention. Fig. 2 is a front view of the same.

Similar letters of reference indicate like parts.

My invention consists in the combination, with a bit, or any suitable boring-tool, of a knife or cutter so constructed and arranged that while the tool is boring the hole in the spile the knife will bevel or round off the end in the manner required.

A designates a gimlet intended to be operated by a brace in the usual way, which I have employed to illustrate my invention; but I wish it understood that any suitable woodboring tool, whether driven by a brace or in a lathe, will answer the purposes of my invention.

B designates the blade of the shaping-knife. This blade is curved from its base to its end slightly outward, so that when it is carried around the end of the spile it will give it the requisite taper. The tang $a$ of the blade is set at right angles, or nearly so, to the blade and it is fitted to pass through an eye or mortise cut through the head or an enlarged portion, $b$, of the boring-tool, as shown clearly in Fig. 1. A thumb-screw, $c$, serves to hold the knife firmly in place, as well as to enable it to be adjusted by placing it farther from or nearer to the boring-tool, to adjust it for shaping a larger or smaller spile.

By this combination I produce a simple tool much needed in sugar-making regions.

What I claim as new, and desire to secure by Letters Patent, is—

The combination of a shaping-knife, B, with a wood-boring tool, A, in such manner as to bore and shape a wooden spile at one operation, substantially as specified.

G. W. WAIT.

Witnesses:
NORTON BRIGGS,
WILLIAM TRUAX.